(12) United States Patent
Kramer

(10) Patent No.: US 6,896,106 B2
(45) Date of Patent: May 24, 2005

(54) METHOD AND ASSEMBLY FOR AUTOMATIC SLACK ADJUSTMENT OF AN ELECTRIC BRAKE ACTUATOR

(75) Inventor: Dennis Kramer, Troy, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 73 days.

(21) Appl. No.: 10/263,174

(22) Filed: Oct. 2, 2002

(65) Prior Publication Data

US 2004/0065516 A1 Apr. 8, 2004

(51) Int. Cl.$^7$ ............................................. F16D 55/02
(52) U.S. Cl. .................... 188/71.7; 188/71.8; 188/71.9; 188/162; 188/196 R; 188/72.8
(58) Field of Search ................ 188/71.7, 71.8, 188/71.9, 79.51, 1.11 W, 1.11 R, 1.11 L, 1.11 G, 156, 162, 196 R, 72.1, 72.8; 310/77, 76, 92, 93

(56) References Cited

U.S. PATENT DOCUMENTS

| | | | | |
|---|---|---|---|---|
| 3,993,173 A | | 11/1976 | Hoffman | |
| 4,015,693 A | | 4/1977 | Hayashida et al. | |
| 4,928,797 A | * | 5/1990 | Harrison | 188/156 |
| 4,941,553 A | * | 7/1990 | Harrison | 188/156 |
| 5,006,772 A | * | 4/1991 | Danby | 318/696 |
| 5,305,856 A | * | 4/1994 | Edwards | 188/79.55 |
| 5,366,280 A | | 11/1994 | Littlejohn | |
| 5,913,390 A | * | 6/1999 | Hostetler | 188/79.51 |
| 6,145,634 A | * | 11/2000 | Holding | 188/72.8 |
| 6,250,434 B1 | | 6/2001 | Baumgartner et al. | |
| 6,311,807 B1 | | 11/2001 | Rinsma | |
| 6,397,981 B1 | * | 6/2002 | Tamasho et al. | 188/71.9 |

FOREIGN PATENT DOCUMENTS

DE 3840685 A1 * 6/1990

* cited by examiner

*Primary Examiner*—Matthew C. Graham
*Assistant Examiner*—Mariano Sy
(74) *Attorney, Agent, or Firm*—Carlson, Gaskey & Olds

(57) ABSTRACT

A method of accommodating wear in an electrically operated brake assembly includes setting a home position when a brake shoe engages a brake drum. A stepper motor drives the brake shoes into engagement with the drum. Upon engagement of the brake shoes with the drum, the stepper motor slips. Slipping of a stepper motor indicates that a home position has been reached. Upon release of the brake, the brake shoe is moved away from the drum a fixed distance. The fixed distance is an optimal distance between the friction member and the rotating member such that regardless of wear, the distance relationship between the brake shoe and drum is maintained.

22 Claims, 3 Drawing Sheets

METHOD AND ASSEMBLY FOR AUTOMATIC SLACK ADJUSTMENT OF AN ELECTRIC BRAKE ACTUATOR

BACKGROUND OF THE INVENTION

This invention relates to an electrically operated brake assembly and a method of accommodating brake lining wear.

A typical brake system includes a hydraulic actuator in hydraulic communication with a hydraulic fluid reservoir. The hydraulic actuator forces brake pads or brake shoes toward a disk or rotor. The brake pads or brake shoes include a friction material that engages the rotating member creating a frictional contact that in turn results in a desired amount of braking torque.

Contact between the friction material lining the brake pads or shoes creates frictional contact with the drum or rotor that in turn creates the desired amount of braking torque to slow and stop the motor vehicle. Repeated braking operations progressively wear away friction material resulting in a progressively thinner brake lining. As the friction material wears, the distance between the brake lining and the rotor or drum increases. The increase in distance increases the amount of mechanical travel required to engage the brake. Various mechanical devices are known in the art to adjust and accommodate for the wearing of the brake lining. These devices adjust the brake pad or shoe in order to maintain a desired distance from the brake rotor or drum.

In some applications an electromechanical actuator provides at least a portion of the braking torque required to stop the motor vehicle. The electromechanical actuator is typically an electric motor that drives the brake pads or shoes into engagement with the rotor or drum. A sensor or sensors are used to determine the position of the brake lining relative to the rotating member and then accommodate and adjust for that distance to continually place the brake lining at an optimal distance relative to the rotating member.

As appreciated, the addition of such sensors and other devices increases the complexity and cost of any brake assembly. Further, sensors require calibration in order to provide for accurate position information. Additionally, brake assemblies operate in harsh environments of wide ranging temperature variation and exposure to various contaminants.

Accordingly, it is desirable to develop a brake assembly that automatically accommodates brake lining wear without the use of separate sensors.

SUMMARY OF THE INVENTION

This invention is an electrically actuated brake assembly that accommodates lining wear by setting a home position of the friction member when engaged with the rotating member and withdrawing the friction member a specified distance relative to the home position.

Slipping of the electric motor indicates engagement with the friction member and a home position of the friction member is set in response to indication of contact with the rotating member. This home position is reset with each actuation of the brake assembly. During operation the brake lining or friction member is released and moved away from the rotating member a fixed distance relative to the home position. As appreciated, by fixing the distance in which the brake lining or friction member moves away from the brake rotor or drum, the distance between the brake lining and the brake rotor or drum is maintained at a desired distance providing a consistent amount of braking torque.

Accordingly, the brake assembly of this invention provides a method and apparatus for automatically accommodating for brake lining wear without the use of additional sensors.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
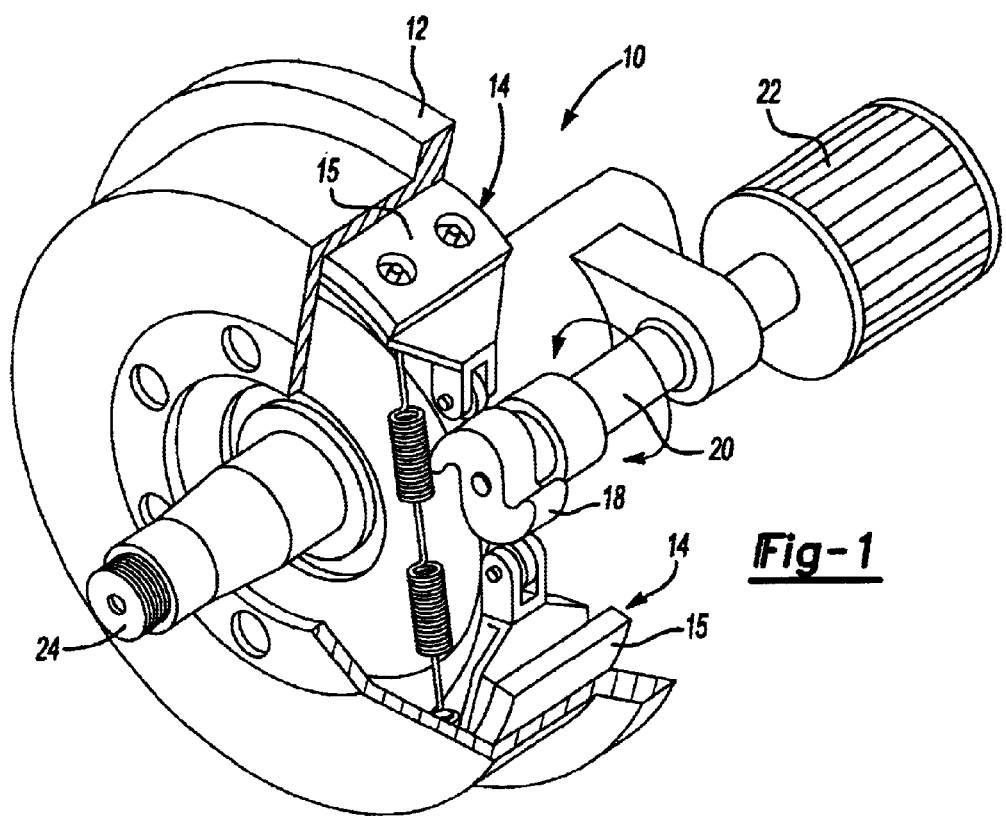
FIG. 1 is a perspective view of a electrically actuated brake drum assembly.

Referring to FIG. 1, a drum brake assembly 10 includes a drum 12 rotating about a spindle 24 that frictionally engages brake shoes 14. The brake shoes 14 are actuated by rotation of a cam 18. The cam 18 is supported along a shaft 20 that is driven by a stepper motor 22. The stepper motor 22 rotates the shaft 20 to rotate the cam 18, which in turn will drive the brake shoes 14 toward the inner diameter of the drum 12. Each of the brake shoes 14 includes a thickness of friction material 15. The friction material 15 engages the inner diameter of the brake drum 12 to create a frictional contact required to create the desired amount of braking torque to slow and stop a motor vehicle. As the friction material 15 of the brake shoes 14 wears, the distance that the cam 18 must rotate increases.

Figure 3A:
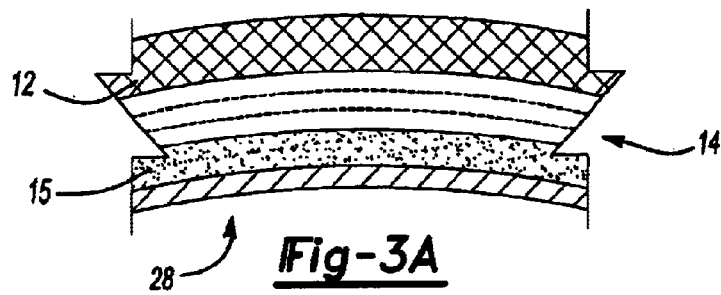
FIG. 3A is a cross-sectional view of a drum brake assembly in a disengaged position.
Figure 3B:
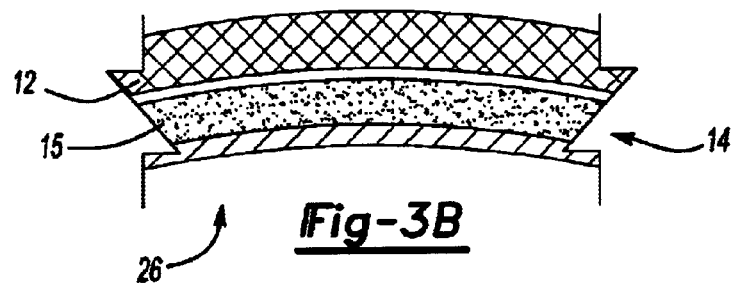
FIG. 3B is a schematic view of a brake drum assembly in an engaged or home position.

Referring to FIGS. 3A and 3B, a home position is determined by slippage of the stepper motor 22 as the frictional material 15 engages the drum 12. The stepper motor 22 rotates a fixed amount according to a specified amount of current drive pulses. In this way, the precise rotation of the stepper motor 22 can be governed and controlled by measuring and providing a set number of drive current pulses. Although a stepper motor 22 is illustrated and preferred, it is within the contemplation of this invention that any type of electromechanical device capable of precisely determining a specific rotation or movement relative to a desired amount of current pulses may be used with this invention.

Figure 2:
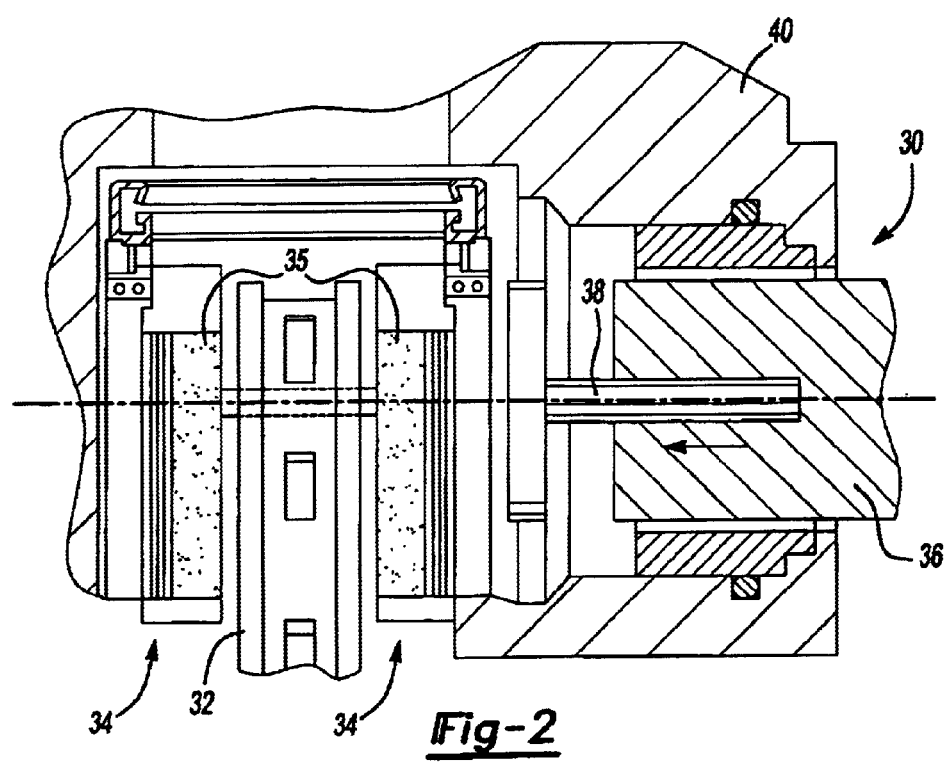
FIG. 2 is a cross-sectional view of an electrically operated disc brake assembly.

Referring to FIG. 2, a disc brake assembly is shown including a housing 40 that supports brake pads 34 including friction material 35. At least one of the brake pads 34 is actuatable by a stepper motor 36. The stepper motor 36 in this embodiment is a linear stepper motor 36 that moves the actuator 38 along a linear path to drive at least one of the brake pads 34 into contact with the rotor 32. In this embodiment of the invention, the rotor 32 is surrounded on each side by the brake pads 34. Each of the brake pads 34 includes an amount of the friction material 35. The friction material 35 contacts the rotor 32 to create the frictional force creating the required braking torque.

Figure 4A:
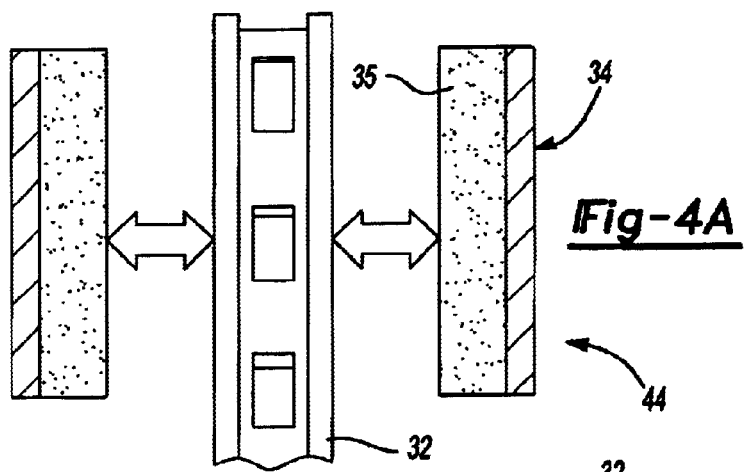
FIG. 4A is a schematic illustration of a disc brake assembly in a disengaged position.
Figure 4B:
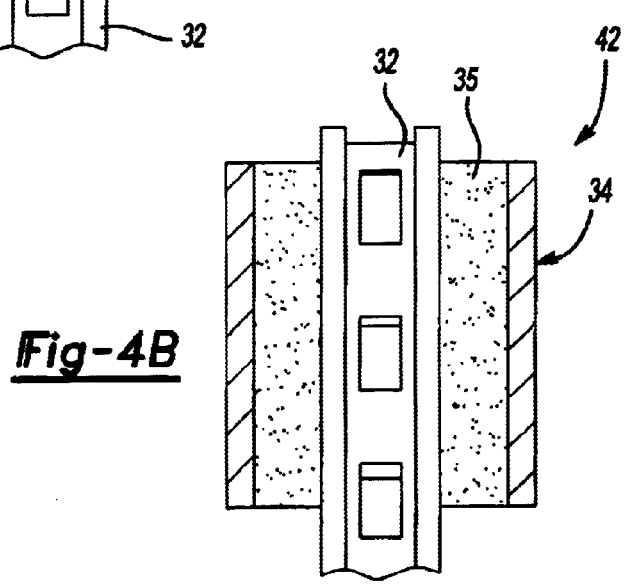
FIG. 4B is a schematic illustration of a disc brake assembly in a disengaged position or home position.

Referring to FIGS. 4A and 4B, the brake pads are movable between a disengaged position as shown in FIG. 4A and an engaged position as shown in FIG. 4B. The engaged position as shown in FIG. 4B causes the stepper motor 36 to slip as it attempts to overcome the forces created by contact with the rotor 32. As appreciated, the electric motor 36 is limited in force and may only drive the brake pads 34 against the rotor 32 with a certain magnitude of force. When it is detected that the stepper motor 36 is no longer moving in response to a certain amount of drive current pulses, a home position is detected. Upon release of the brake, the stepper motor 36 reverses and moves the brake pads 34 a fixed distance relative to the home position. The fixed distance is selected to provide sufficient clearance between the brake pads 34 and the rotor 32 when not engaged, and to limit the distance the brake pad 34 must travel to engage the rotor 32.

Referring to FIG. 1, the operation of the brake assembly 10 includes the steps of driving the brake shoes 14 into engagement with the drum 12 with the stepper motor 22. Movement of the stepper motor 22 is accomplished by communicating a series of current drive pulses. As appreciated, stepper motors 22 typically operate by moving a specific rotational or linear distance relative to each current drive pulse. Once the stepper motor 22 has driven the brake shoe 14 against the drum 12, movement of the rotating shaft 20 along with the stepper motor 22 stops relative to incoming current drive pulses. This slip indicates that the home position has been reached. The home position is the position where the brake shoes 14 are engaged completely with drum 12 and exert a desired amount of force to create the desired amount of braking torque. This amount of slip relative to the amount of current drive pulses indicates when the home position has been reached.

Upon release of the brake, the brake shoes 14 release to allow rotation of the drum 12. The brake shoes are moved away from the drum 12 by reversing rotation of the stepper motor 22. The stepper motor 22 reverses to move the brake shoes 14 away from the drum 12 a fixed distance. The fixed distance is determined as an optimal distance from the drum 12 to provide clearance and a desired amount of braking torque.

As appreciated, because the brake shoe 14 is moved away from the drum 12 a fixed distance after being released from the home position, the brake shoe 14 will always be at an optimal distance relative to the drum 12 regardless of the thickness of the friction material 15. As the friction material 15 on the brake shoe 14 wears, the home position is adjusted toward the drum 12. The home position is continuously adjusted as the friction material 15 wears resulting in the brake shoe 14 always being in a specified relationship relative to the drum 12. The relationship between the brake shoe 14 and the drum 12 is continuously adjusted such that the distance between the brake shoe 14 and the drum 12 remains constant in the disengaged position regardless of the amount of friction material 15.

Referring to FIG. 2, during operation of the disk brake assembly 30, the stepper motor 36 advances the brake pads 34 into engagement with the rotor 32. Movement of the brake pads 34 are detected relative to the number of current drive pulses communicated to the stepper motor 36. Note that in this embodiment the stepper motor 36 drives the brake pads 34 linearly through actuator 38. Once the brake pads 34 have engaged the rotor 32, a home position is detected in response to motor slip. Disengagement of the brake pads 34 is accomplished by moving the brake pads 34 a fixed distance away from the set home position. Movement a fixed distance provides a consistent distance for travel for the brake pads 34 toward engagement regardless of the amount of friction material.

Figure 5:
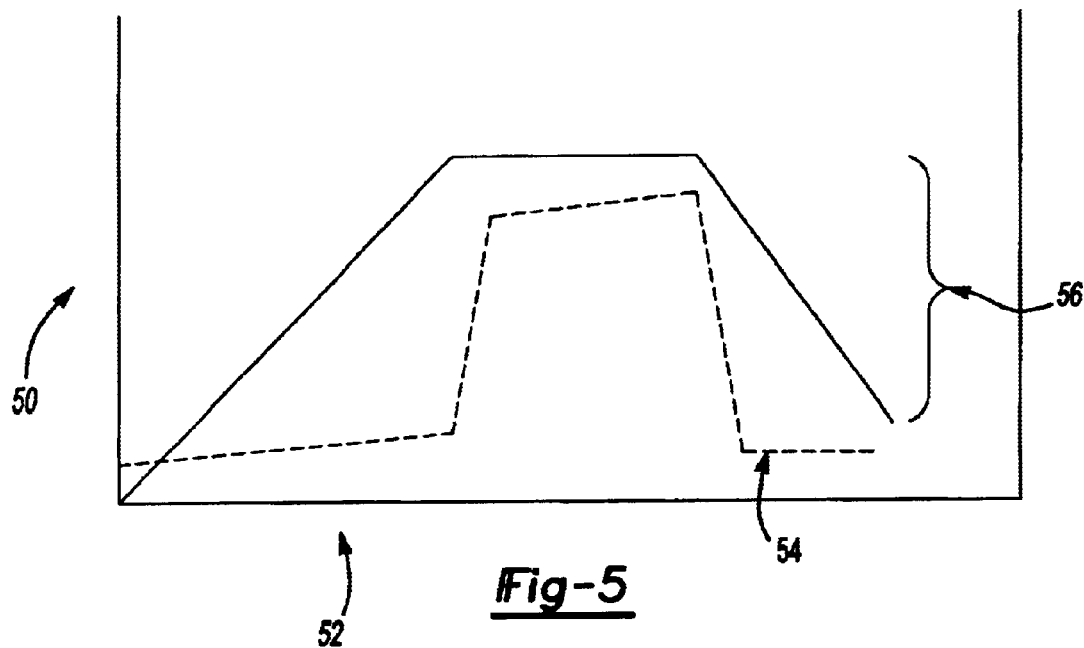
FIG. 5 is a graphical representation of a braking cycle.

Referring to FIG. 5, a graphical illustration of the displacement of the brake shoe 14, relative to the drum 12 is shown. The displacement 50 is shown relative to the braking force 54. Note that the displacement of the shoe 14 indicated at 50 concurs with the amount of force 54 exerted. At point 60 where the brake is released, the distance or displacement is fixed. The fixed distance results in a new start position after each brake actuation. The new start position provides the optimal distance between the shoes 14 and the drum 12.

Figure 6:
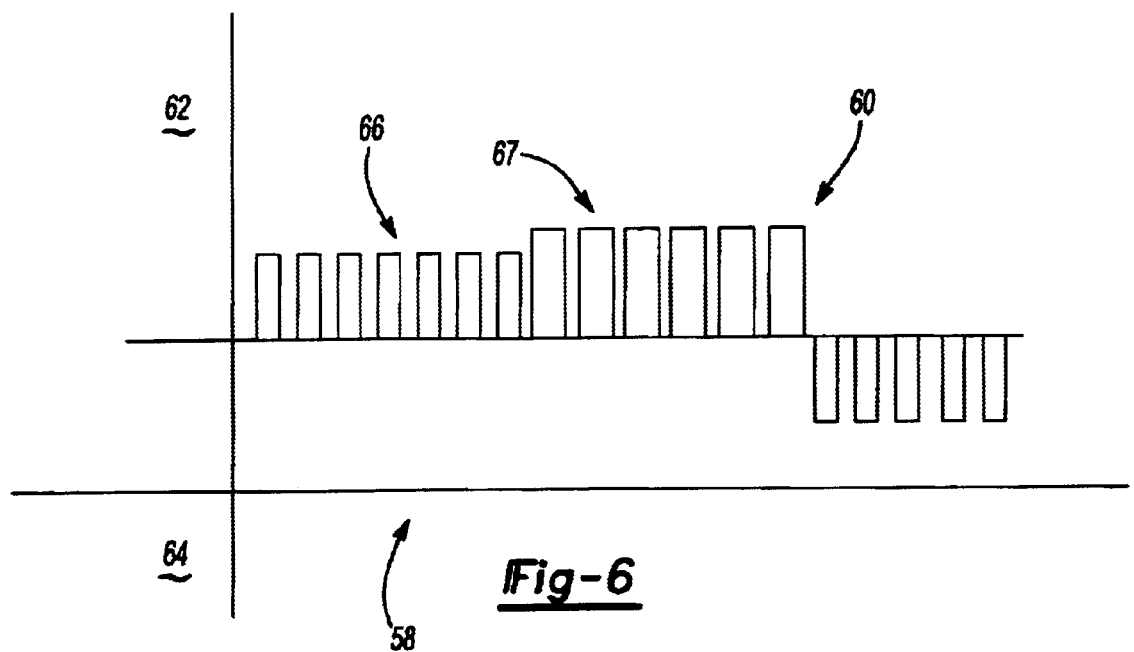
FIG. 6 is a graphical representation of the current drive pulses through a single braking cycle.

Referring to FIG. 6, graphical illustration of the current drive pulses during movement or actuation of the friction member towards the rotating member is shown. Note that the forward movement indicated at 62 and above the X axis shows the amount of current drive pulses 66 as the shoe 14 approaches and engages the drum 12. The current drive pulses are shown enlarged once the shoe 14 is in contact with the drum 12 as indicated at 67. Current drive pulses indicated at 60 illustrate release of the brake and reversing of the stepper motor a fixed amount to provide the fixed displacement and the new start position as indicated at 56 in FIG. 5.

The foregoing description is exemplary and not just a material specification. The invention has been described in an illustrative manner, and should be understood that the terminology used is intended to be in the nature of words of description rather than of limitation. Many modifications and variations of the present invention are possible in light of the above teachings. The preferred embodiments of this invention have been disclosed, however, one of ordinary skill in the art would recognize that certain modifications are within the scope of this invention. It is understood that within the scope of the appended claims, the invention may be practiced otherwise than as specifically described. For that reason the following claims should be studied to determine the true scope and content of this invention.

What is claimed is:

1. A method of accommodating for wear in an electrically actuated brake assembly comprising the steps of;
    (a.) driving a friction member against a rotating member corresponding to movement of a stepper motor;
    (b.) detecting slip or the stepper motor indicating engagement between said friction member and said rotating member;
    (c.) setting a home position in response to detecting slip of the stepper motor; and
    (d.) retracting said friction member from said rotating member a desired distance from said home position with said stepper motor.

2. The method of claim 1, further defining step b. as detecting a number of current drive pulses relative to movement of said stepper motor, and detecting slip in response to movement of said stepper motor decreasing relative to said number of current drive pulses.

3. The method of claim 1, further defining step b as detecting a number of current drive pulses relative to movement of said stepper motor and detecting slip in response stepper motor movement ceasing relative to said number of current drive pulses.

4. The method of claim 1, wherein said desired distance is determined by a specific number of current drive pulses indicative of a fixed displacement of said friction member from said rotating member.

5. The method of claim 1, wherein said stepper motor is a rotary displacement stepper motor.

6. The method of claim 1, wherein said stepper motor is a linear displacement stepper motor.

7. The method of claim 1, wherein said stepper motor drives movement of said friction member against said rotating member.

8. The method of claim 1, wherein said rotating member is further defined as a rotor, and said friction member are brake pads.

9. The method of claim 1, wherein said rotating member is further defined as a drum, and said friction member is further defined as a brake shoe.

10. The assembly as recited in claim 1, wherein step a comprises directly driving said friction member with said stepper motor through a mechanical linkage.

11. The assembly as recited in claim 1, wherein said stepper motor is engage to directly drive said friction member.

12. An electrically operated brake assembly comprising;
   a rotating member;
   at least one friction member movable between an engaged position connection said rotating member, and a disengaged position;
   a stepper motor moving in response to a number of current drive pulses, said stepper motor driving movement of said friction member between said engaged and disengaged positions, wherein a home position of the stepper motor is determined responsive to decreased movement of the stepper motor to said drive pulses.

13. The assembly of claim 12, wherein a home position is determined in response to a stoppage of movement of said stepper motor relative to said current drive pulses in response to said friction member contacting said rotating member.

14. The assembly of claim 12, wherein said stepper motor moves said friction member a fixed distance from said rotating member toward said disengaged position.

15. The assembly of claim 14, wherein said fixed distance corresponds to a fixed number of current drive pulses.

16. The assembly of claim 12, wherein said rotating member and said friction member are further defined as a rotor and brake pads.

17. The assembly of claim 12, wherein said rotating member and said friction member are further defined as a drum and brake shoe.

18. The assembly of claim 12, wherein said stepper motor is a rotary displacement stepper motor.

19. The assembly of claim 12, wherein said stepper motor is a linear displacement stepper motor.

20. The assembly as recited in claim 12, comprising a mechanical linkage between said stepper motor and said friction member.

21. The assembly as recited in claim 20, wherein said mechanical linkage comprises a cam rotated by said stepper motor.

22. The assembly as recited in claim 20, wherein said mechanical linkage comprises an actuator driven linearly by said stepper motor.

* * * * *

UNITED STATES PATENT AND TRADEMARK OFFICE
CERTIFICATE OF CORRECTION

PATENT NO.    : 6,896,106 B2
DATED         : May 24, 2005
INVENTOR(S)   : Kramer, Dennis It is certified that error appears in the above-identified patent and that said Letters Patent is hereby corrected as shown below:

Column 5,
Line 22, please replace "engage" with -- engaged --
Line 27, please replace "connection" with -- contacting --

Signed and Sealed this

Twelfth Day of July, 2005

JON W. DUDAS
*Director of the United States Patent and Trademark Office*